US010633204B2

(12) United States Patent
Verheij et al.

(10) Patent No.: US 10,633,204 B2
(45) Date of Patent: Apr. 28, 2020

(54) APPARATUS FOR AUTOMATICALLY UNSTACKING A PALLET ON WHICH AT LEAST TWO STACKS OF BLANKS ARE ARRANGED

(71) Applicant: BUHRS PACKAGING SOLUTIONS B.V., Zaandam (NL)

(72) Inventors: Benedictus Johannes Maria Verheij, Rotterdam (NL); Nicolaas Gerardus Geelkerken, Reeuwijk (NL)

(73) Assignee: BUHRS PACKAGING SOLUTIONS B.V., Zaandam (NL)

( * ) Notice: Subject to any disclaimer, the term of this patent is extended or adjusted under 35 U.S.C. 154(b) by 0 days.

(21) Appl. No.: 15/977,527

(22) Filed: May 11, 2018

(65) Prior Publication Data

US 2018/0327201 A1 Nov. 15, 2018

(30) Foreign Application Priority Data

May 12, 2017 (NL) ...................................... 2018907

(51) Int. Cl.
| | |
|---|---|
| *B65H 3/08* | (2006.01) |
| *B65H 5/08* | (2006.01) |
| *B65H 1/28* | (2006.01) |
| *B31B 50/06* | (2017.01) |
| *B25J 9/04* | (2006.01) |

(Continued)

(52) U.S. Cl.
CPC ............ *B65H 3/0816* (2013.01); *B25J 9/043* (2013.01); *B31B 50/06* (2017.08); *B65G 47/64* (2013.01); *B65G 59/04* (2013.01); *B65H 1/28* (2013.01); *B65H 5/08* (2013.01)

(58) Field of Classification Search
CPC ...... B65G 47/90; B65G 47/91; B65G 47/907; B65G 47/918; B65G 59/04; B65G 59/045; B65G 59/026; B65H 5/08; B65H 2301/3422; B65H 2301/44714; B65H 5/16; B65H 2301/44765; B65H 3/0816;

(Continued)

(56) References Cited

U.S. PATENT DOCUMENTS

| 3,888,364 A | 6/1975 | Inoue et al. |
| 4,768,913 A | 9/1988 | Baba |

(Continued)

FOREIGN PATENT DOCUMENTS

| JP | 7-101550 A | 4/1995 |
| WO | WO 2016/116362 A1 | 7/2016 |

*Primary Examiner* — Gregory W Adams
(74) *Attorney, Agent, or Firm* — Birch, Stewart, Kolasch & Birch, LLP (57) ABSTRACT

Apparatus for automatically unstacking a pallet on which at least two stacks of blanks are arranged. The apparatus comprises an unstacking station which is configured for receiving a pallet on which are arranged at least two stacks of blanks in collapsed condition. The unstacking station is further configured for taking off one by one individual blanks from the at least two stacks of blanks which are on a pallet received in the unstacking station. The apparatus further includes a feed track for conveying pallets. The feed track links up by a discharge end with the unstacking station for the purpose of feeding a pallet with stacks of blanks to be unstacked to the unstacking station. Further, the apparatus includes a blank main discharge assembly for discharging individual blanks to a further processing station.

23 Claims, 5 Drawing Sheets

(51) Int. Cl.
*B65G 47/64* (2006.01)
*B65G 59/04* (2006.01)

(58) Field of Classification Search
CPC .. B31B 50/06; Y10S 414/108; Y10S 414/106; Y10S 414/107
See application file for complete search history.

(56) References Cited

U.S. PATENT DOCUMENTS

| | | | |
|---|---|---|---|
| 5,336,042 A * | 8/1994 | Winski | B65B 11/585 |
| | | | 206/386 |
| 7,993,095 B2 * | 8/2011 | Reichler | B65G 57/24 |
| | | | 414/789.5 |
| 9,126,771 B2 * | 9/2015 | Saison | B65H 3/0816 |
| 2010/0232923 A1 | 9/2010 | Dörner et al. | |
| 2013/0108408 A1 | 5/2013 | Saison et al. | |
| 2013/0115040 A1 * | 5/2013 | Masutomi | B25J 9/1682 |
| | | | 414/792.7 |
| 2015/0078877 A1 * | 3/2015 | Brandmuller | B65G 59/026 |
| | | | 414/796.2 |

* cited by examiner

APPARATUS FOR AUTOMATICALLY UNSTACKING A PALLET ON WHICH AT LEAST TWO STACKS OF BLANKS ARE ARRANGED

FIELD

The invention relates to an apparatus for automatically unstacking a pallet on which at least two stacks of blanks are arranged.

BACKGROUND

Currently, in practice, blanks intended to be set up to form boxes are supplied in stacks on pallets. Often, there are two or more, generally four, stacks of blanks on a pallet. When a pallet with blanks arrives, in most cases, the stacks are covered by a cover to stabilize the stacks relative to each other and to prevent damaging of the topmost blanks of the stack. Often, so-called intermediate sheets are placed at regular distances between the stacks. Such intermediate sheets have a dimension that is such that a single intermediate sheet extends between all stacks of blanks that are on the pallet. The intermediate sheets, in turn, also impart additional stability to the stacks.

The stacks of blanks are processed manually by an operator. This includes, inter alia, getting a pallet with blanks from a warehouse, removing the cover from the stacks of blanks of the pallet concerned and then manually removing partial stacks of blanks and placing these partial stacks on an unstacking station or placing the blanks one by one on a blank main discharge assembly for transport for further processing, for example to a box setup device known per se. Periodically, the operator will have to remove and store the intermediate sheets somewhere. When the pallet is empty, the operator will have to move the pallet to a storage and proceed to fetch a next pallet with new blanks and process it similarly.

SUMMARY

As will be apparent from the foregoing description, the manual processing of pallets filled with stacks of blanks is labor intensive and time consuming. Moreover, the further processing of the blanks often requires a continuous supply of blanks, so that generally more than one operator is needed to perform the various activities in such a way that this continuous supply is guaranteed.

The object of the invention is to provide an automated solution for the processing of pallets with blanks in an automated manner, whereby the blanks are discharged one by one for further processing.

To this end, the invention provides an apparatus according to claim 1.

More particularly, the invention provides an apparatus for automatically unstacking a pallet on which at least two stacks of blanks are arranged, the apparatus comprising:
an unstacking station configured for:
receiving a pallet on which are arranged at least two stacks of blanks in collapsed condition; and for
taking off one by one individual blanks from the at least two stacks of blanks which are on a pallet which is received in the unstacking station;
a feed track for conveying pallets, the feed track linking up by a discharge end with the unstacking station for the purpose of feeding a pallet with stacks of blanks to be unstacked to the unstacking station;
a blank main discharge assembly for discharging individual blanks to a further processing station.

With the aid of the apparatus according to the invention the pallets with stacks of blanks are automatically supplied to the unstacking station. In the unstacking station the stacks are singulated into individual blanks which are transferred to the blank main discharge assembly for discharge of individual blanks for further processing in a further processing station, such as, for example, a box setup device. With the aid of the apparatus according to the invention, the pallet supply and blank singulation operations can be executed in a fully automated and non-stop manner, which saves at least one worker per processing line. The feed track can have its in-feed side, for example, in a warehouse where a logistic worker with a forklift truck only needs to place pallets with stacks of blanks on the feed track. The continuation of the process is further dealt with in a fully automated manner by the apparatus according to the invention.

Further elaborations of the invention are described in the dependent claims and will hereinafter, with reference to an example that is represented in the figures, be further clarified.

DETAILED DESCRIPTION

In the following detailed description, with the aid of reference numerals, reference is made to the example that is represented in the figures. The embodiments that are described in the detailed description, however, are not limited to the example that is shown in the figures but may also be implemented in a different manner than shown in the example. Therefore, the embodiments described in the detailed description should also be read and understood without the reference numerals. The various embodiments to be described hereinafter can be applied in combination with each other or independently of each other.

In most general terms, the invention provides an apparatus for automatically unstacking a pallet P on which at least two stacks of blanks B are arranged. The apparatus comprises an unstacking station 12 which is configured for receiving a pallet P on which are arranged at least two stacks of blanks B in collapsed condition. Further, the unstacking station 12 is configured for taking off one by one individual blanks B from the at least two stacks of blanks B which are on a pallet P taken up in the unstacking station 12. The apparatus further comprises a feed track 14 for transporting pallets P. The feed track 14 links up by a discharge end thereof with the unstacking station 12 for the purpose of feeding a pallet with blanks B to be unstacked to the unstacking station 12. Further, the apparatus includes a blank main discharge assembly 16 for discharging individual blanks B to a further processing station.

Figure 1:
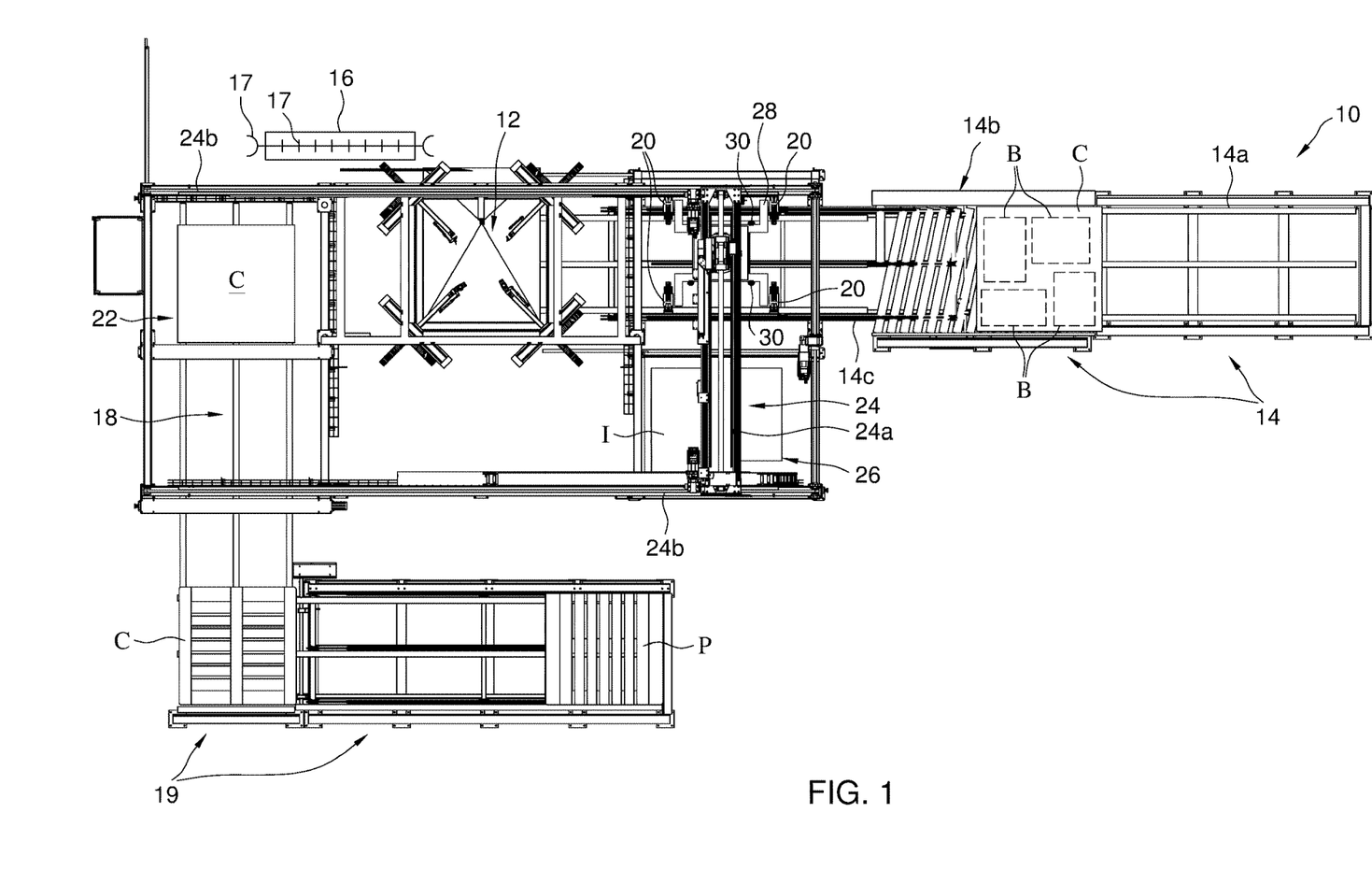
FIG. 1 shows a top plan view of an example of the apparatus according to the invention.
Figure 2:
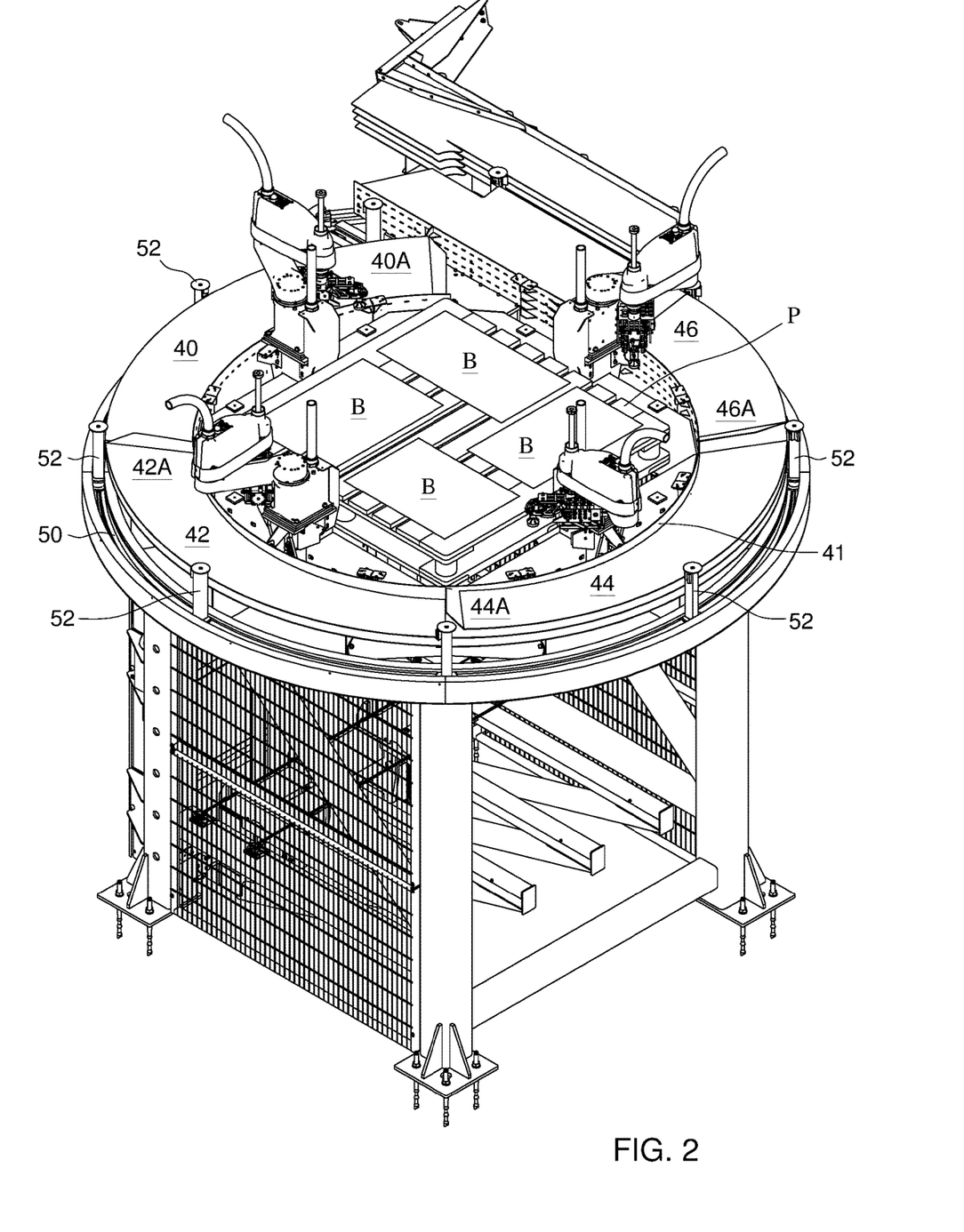
FIG. 2 shows a perspective view of an example of an unstacking station which is part of the example represented in FIG. 1.
Figure 3:
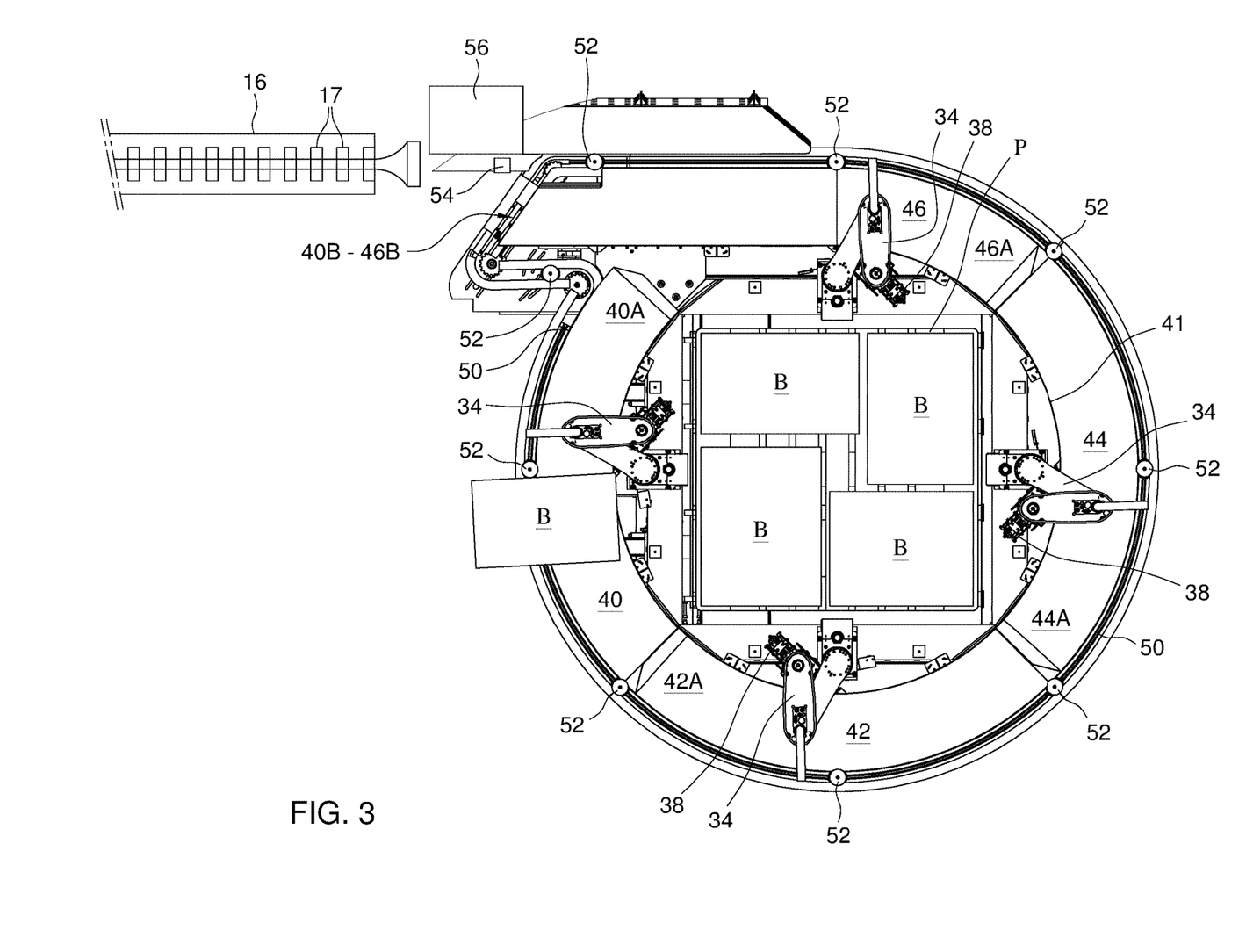
FIG. 3 shows a top plan view of the unstacking station of FIG. 2.
Figure 4:
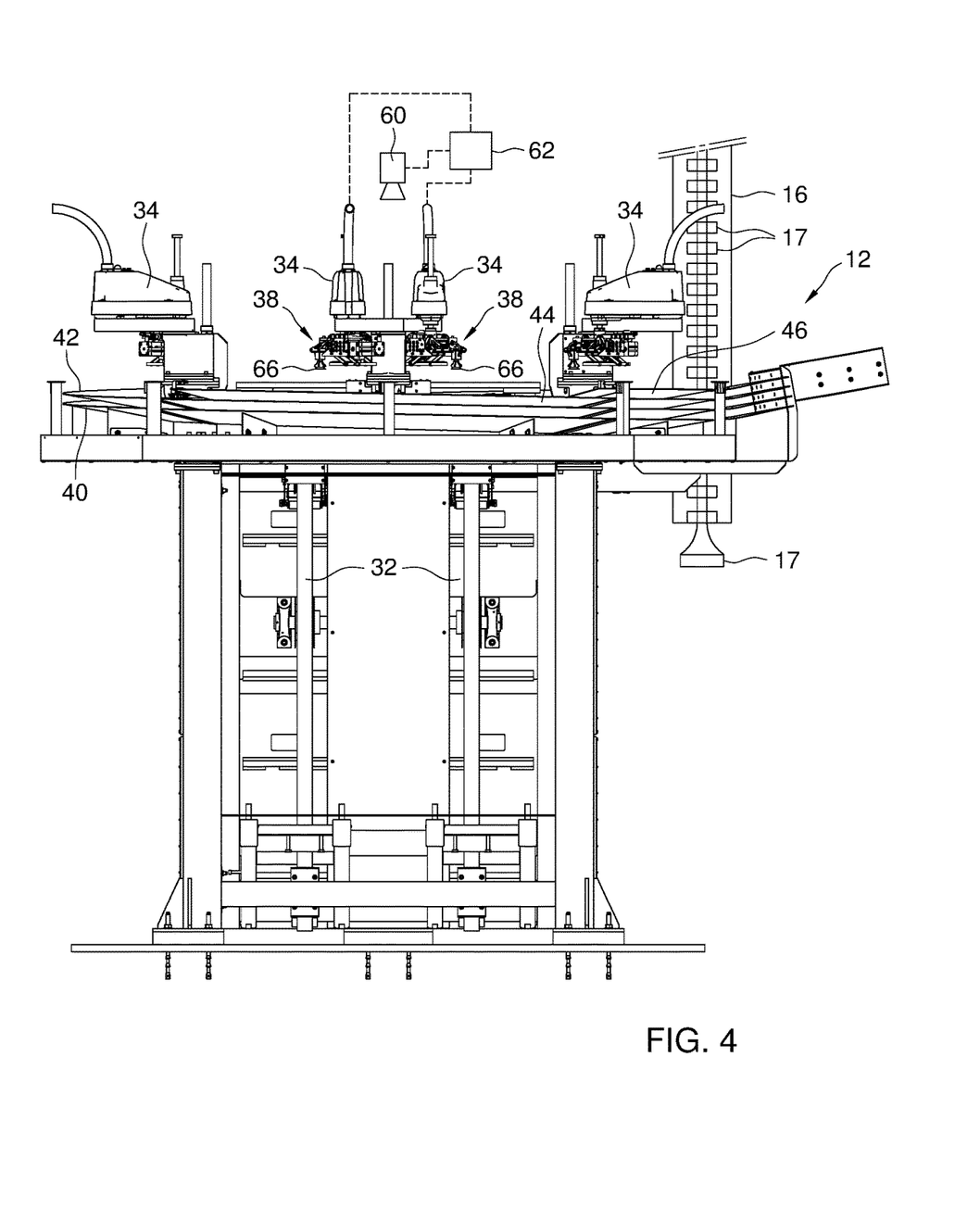
FIG. 4 shows a front view of the unstacking station of FIG. 1.

A top plan view of an example of the apparatus 10 is shown in FIG. 1. In FIG. 1, for clarity, the unstacking station 12 is not included. The reference numeral 12 in FIG. 1 merely designates the position where the unstacking station 12 is situated. An example of the unstacking station 12 is represented in FIGS. 2-4.

The advantages of the apparatus according to the invention have already been described above in the section headed "SUMMARY" and are understood to be inserted here by reference.

In an embodiment, of which an example is shown in FIG. 1, the apparatus may include a pallet buffer position 18 for storing empty pallets. In such an embodiment, the apparatus may additionally include a conveying device 24 for conveying an empty pallet P from the unstacking station 12 to the pallet buffer position 18.

By addition of a pallet buffer position 18 and a conveying device 24 to the apparatus, intervention of an operator is not necessary either when the pallet P that is in the unstacking station 12 is empty. When the apparatus establishes, for example with the aid of a sensor, that the pallet P is empty, the pallet P can be removed from the unstacking station and, via the conveying device 24, be brought into the pallet buffer position 18.

In an embodiment, of which an example is shown in the figures, the apparatus may include a cover buffer position 22 for storing covers C with which the at least two stacks of blanks on a pallet P are covered. The apparatus 10 may then further include a conveying device 24 for conveying a cover C from the unstacking station 12 to the cover buffer position 22.

With the aid of this embodiment, a cover C with which the stacks of blanks B that are on a pallet P are covered can be taken off the stacks and be carried off for temporary storage in the cover buffer position 22. What is thus accomplished is that this operation, too, is carried out in an automated manner without intervention of an operator.

In an embodiment, of which an example is shown in the figures, the apparatus can include an intermediate sheet buffer position 26 for storing intermediate sheets I which extend at different height levels between the blanks B of the at least two stacks of blanks B. In such an embodiment, the apparatus also includes a conveying device 24 for conveying the intermediate sheets I from the unstacking station 12 to the intermediate sheet buffer position 26.

With this embodiment, also the intermediate sheets I can be automatically taken off the stacks and stored in the intermediate sheet buffer position 26. Intervention of an operator is not necessary.

In an embodiment, of which an example is shown in the figures, the conveying device 24 for (i) conveying a pallet P from the unstacking station 12 to the pallet buffer position 18, for (ii) conveying a cover C from the unstacking station 12 to the cover buffer position 22, and for (iii) conveying the intermediate sheets I from the unstacking station 12 to the intermediate sheet buffer position 26, may be implemented as a single system which comprises a portal conveyor 24 provided with a gripper 28. In the example of FIG. 1, a portal 24*a* is visible which is mobile over a rail or rails 24*b*. The gripper 28 is disposed so as to be displaceable in the length direction of the portal 24*a* and movable up and down. The gripper 28 may then be configured for picking up a pallet P, a cover C or an intermediate sheet I at the unstacking station 12, and for delivering a pallet P to the pallet buffer position 18, a cover C to the cover buffer position 22, and for delivering an intermediate sheet I to the intermediate sheet buffer position 26.

A portal conveyor 24 extends above the unstacking station 12 and the various buffer positions 18, 22, 26, and with the aid of the gripper 28 both pallets P, covers C and intermediate sheets I can be picked up and conveyed from the unstacking station 12 to, respectively, the pallet buffer position 18, the cover buffer position 22 and the intermediate sheet buffer position 26. A portal solution takes up relatively little floor area which is advantageous from the viewpoint of factory space utilization.

In an embodiment, of which an example is shown in the figures, the gripper 28 may be provided with suction cups 30 for picking up intermediate sheets I. The gripper 28 may then be additionally provided with mechanical gripper arms 20 for picking up pallets P. From a safety point of view, such a gripper 28 is advantageous. After all, if the suction cups 30 were also used for picking up pallets P, and if the reduced pressure in the suction cups 30 should fall away, then a heavy pallet P would fall down directly, with risk of injury to the operator. Since the intermediate sheets I are made from cardboard and so are relatively vulnerable, engagement with mechanical gripper arms is less suitable. Hence, it is preferred to use mechanical gripper arms 20 for the pallets P and the suction cups 30 for the intermediate sheets I. In this embodiment, suction cups 30 and/or the gripper arms 20 may be configured for picking up a cover C. In general, a cover C in this context is formed by an upper half of a pallet and the cover C is therefore a stiff construction of wood. Under these circumstances, the gripper arms 20 will be used for picking up a cover. When the covers are made from cardboard, however, the suction cups 30 may be used for picking up a cover C.

In the example shown in FIG. 1, there is further shown a discharge track 19 for empty pallets P and for covers C. The discharge track 19 in the example shown is implemented as a chain path, but roller conveyors or conveyor belts may also be employed for this purpose. The feed track 14 in the example shown is implemented as a chain path 14*a*, 14*c* in which an aligning buffer 14*b* is included. The aligning buffer 14*b* comprises a number of rollers which are disposed so as to slope to one longitudinal edge, so that upon transport of a pallet P over this aligning buffer 14*b*, the pallet P is aligned against the relevant longitudinal edge of the aligning buffer 14*b*.

In an embodiment, of which an example is shown in FIGS. 2-4, the unstacking station 12 may include a lift 32 on which a pallet P with at least two stacks of blanks B is placeable. In that embodiment, the apparatus 10 is provided with an electronic control for operating the lift 32, such that an upper side of the at least two stacks of blanks B is held at substantially the same level during unstacking.

When the uppermost blanks B of the stacks are held at substantially the same level by suitable control of the lift 32, the mechanism with the aid of which the blanks are picked up from the stacks can be made of relatively simple design because it can pick up the blanks B each time at approximately the same position.

In an embodiment, of which an example is shown in the figures, the unstacking station 12 can comprise at least two robots 34. In that embodiment, with each stack of the at least two stacks, a robot 34 is associated. The robots 34 are then provided with a robot arm 36 having at the free end a pickup mechanism 38 for picking up a single blank B from the stack of blanks with which the respective robot 34 is associated. Further, in this embodiment, the unstacking station 12 includes at least one blank intermediate discharge track 40, 42, 44, 46. The at least two robots 34 are then each configured for delivering a blank B situated in the pickup mechanism 38 to a blank intermediate discharge track 40, 42, 44, 46.

Singulation of the individual blanks B of the stacks, in this embodiment, takes place with the aid of robots 34, whereby each stack is unstacked by the robot 34 associated with that stack. This provides the advantage that the unstacking of the at least two stacks—the example involves four stacks—can take place simultaneously. In the example shown, for instance, every three seconds, per robot 34, a blank B can be taken off the stack. With, in this example, four robots 34 performing this activity simultaneously, at the exit of the unstacking station 12 every ¾ s a blank can be delivered to the blank main discharge assembly 16. As relatively much time is available for picking up an individual blank B from a stack, the process of picking up can be carried out reliably and also the placing of an individual blank on a blank intermediate discharge track can be carried out accurately. This is of importance to be able to guarantee an operationally reliable functioning of the apparatus.

In an embodiment, of which an example is shown in the figures, each robot 34 may be a SCARA robot. SCARA robots are standard commercially available robots and are particularly reliable in operation while their cost price is acceptable, partly because the control of a SCARA robot is relatively simple. SCARA is an abbreviation of Selective Compliance Articulated Robot Arm.

In an embodiment, of which an example is shown in the figures, each robot 34 may be associated with a respective corresponding blank intermediate discharge track 40, 42, 44, 46, such that the number of blank intermediate discharge tracks 40, 42, 44, 46 corresponds to the number of robots 34. Each blank intermediate discharge track 40, 42, 44, 46 may then traverse a spiral path over a segment of a circle. A starting point 40A, 42A, 44A, 46A of the spiral path of the blank intermediate discharge track 40, 42, 44, 46 belonging to a robot is in the proximity of the robot 34 associated with the respective blank intermediate discharge track 40, 42, 44, 46. Each blank intermediate discharge track 40, 42, 44, 46 has an end point 40B, 42B, 44B, 46B and the end points 40B, 42B, 44B, 46B of the at least two blank discharge tracks 40, 42, 44, 46 are located above each other. Furthermore, in this embodiment the spiral paths of the at least two blank intermediate discharge tracks 40, 42, 44, 46 are located above each other. An in-feed side 16A of the blank main discharge assembly 16 is near the end points 40B, 42B, 44B, 46B, such that blanks B that are on the end points 40B, 42B, 44B, 46B of the blank intermediate discharge tracks 40, 42, 44, 46 are transferrable onto or into the blank main discharge assembly 16.

The blank intermediate discharge tracks 40-46 in this embodiment can be implemented relatively simply, for example as spiral plate parts which, for example, are connected on the radially inwardly facing longitudinal edge with an upstanding wall part 41 of small height. The blank discharge tracks 40-46 may not only be disposed in a manner inclined in tangential direction, so that they traverse a spiral path, but may also be disposed in a manner inclined in radial direction. As a result of this radially inclined disposition, for example, the radially inner edge of the blank discharge track can be in a lower position than a radially outer edge of the blank discharge track. Due to this inclination in radial direction, the blanks B will tend, under the influence of gravity, to slide against the upstanding wall part 41, so that the position of the blanks on the blank intermediate discharge tracks 40-46 is well-defined and stable.

In an embodiment, of which an example is shown in the figures, for the purpose of advancing the blanks B over the blank intermediate discharge tracks 40-46, the apparatus may include a cam intermediate conveyor. Such a cam intermediate conveyor comprises a cam chain or cam belt 50 which extends over a circular segmental path which is substantially concentric with the spiral paths of the at least two blank intermediate discharge tracks 40, 42, 44, 46. Further, connected with the cam chain or cam belt 50 are cams 52 which are configured for, upon transport of the cam chain or cam belt 50 and hence upon displacement of respective cams 52 along the spiral paths, pushing on blanks B that are on the blank intermediate discharge tracks 40, 42, 44, 46 over the respective blank intermediate discharge tracks 40, 42, 44, 46 to the endpoints 40B, 42B, 44B, 46B of those respective blank intermediate discharge tracks 40, 42, 44, 46. In the top plan view of FIG. 3, a blank B is represented which is on the blank intermediate discharge track 40 and is pushed on over this blank intermediate discharge track 40 by a cam 52. It is clear that, in use, by each cam a blank B is pushed on over one of the blank intermediate discharge tracks 40, 42, 44, 46. For the purpose of clarity, however, only one blank B is shown on the blank intermediate discharge tracks 40-46.

Such a construction is relatively inexpensive in that a minimum number of moving parts are involved. Only the cam intermediate conveyor requires a motor for driving the cam chain or cam belt 50. As a result, this embodiment is particularly reliable in operation. Moreover, the blank intermediate discharge tracks 40, 42, 44, 46 provide a compact construction which takes up little floor area in that the blank intermediate discharge tracks 40, 42, 44, 46 extend above each other. The unstacking station 12 in this embodiment can therefore be of compact design.

The cam chain or cam belt 50 may be moved on continuously or intermittently. The preference is an intermittent transport. Thus, in the example shown, the cam chain or cam belt 50 may be provided with cams which are at a mutual distance such that on the blank intermediate discharge tracks 40, 42, 44, 46 there can be blanks in each sector of 45°. Upon each propulsive step the cam chain or cam belt 50 makes, a cam 52 as mentioned then moves through an angle of approximately 45° further along the spiral paths which the blank intermediate discharge tracks 40, 42, 44, 46 traverse. In the sector in which there is only one blank intermediate discharge track 40, with a cam 52 only one blank B is pushed on. In the sector in which there are four blank intermediate discharge tracks 40-46 above each other, with each cam 52 four blanks B are propelled. With such an embodiment, therefore, in an operationally reliable manner, in each case four individual blanks B are supplied at the end points 40B, 42B, 44B, 46B of the blank intermediate discharge tracks 40-46 for sequential discharge to the blank main conveyor 16.

In the example shown, the cam chain or cam belt 50 extends on the radially outer side of the blank intermediate discharge tracks 40-46. In an alternative implementation, however, it is also possible that the cam chain or cam belt 50 extends on a radially inner side of the blank intermediate discharge tracks 40-46. In such a variant, the radial inclination of the blank intermediate discharge tracks 40-46 will then be precisely such that a radially inner side of a blank intermediate discharge track 40-46 lies higher than the radially outer side thereof. In yet another variant, it is possible that the blank intermediate discharge tracks 40-46 are each provided with a central recess which extends throughout the length of the path of the respective blank intermediate discharge tracks 40-46. The cam chain or cam belt 50 may then extend under the blank intermediate discharge tracks 40-46, and the cams 52 can extend through the central recess. With such an embodiment, it is furthermore possible that both longitudinal edges of the blank intermediate discharge tracks are provided with an upstanding wall part of small height. In this latter variant the blanks B are then moved forward over the blank intermediate discharge tracks 40-46 between two upstanding wall parts, whereby the chance of the blanks B falling off the blank intermediate discharge tracks 40-46 has been wholly minimized.

In an embodiment, of which an example is shown in the figures, the blank main discharge assembly 16 can comprise a gripper chain which includes a conveyor chain with grippers 17 attached thereto. Each gripper is then configured for engaging a single blank B.

In themselves, such gripper chains are known, for example for conveying printed newspapers in a machine room, so that a further explanation thereof is not necessary. An example of a supplier of such gripper chains is Ferag AG.

In an alternative further elaboration, the blank main discharge assembly 16 may also be implemented as a conveyor track or conveyor belt onto which the individual blanks collected at the end points 40B, 42B, 44B, 46B can be transferred, for example by a cam discharge conveyor, not shown, which is disposed at the end points 40B, 42B, 44B, 46B of the blank intermediate discharge tracks 40, 42, 44, 46. The cam discharge conveyor may be provided, in this embodiment, with a discharge chain or discharge belt and with a number of discharge cams which are connected with the discharge chain or discharge belt. Preferably, the number of discharge cams corresponds to, or is a multiple of, the number of blank intermediate discharge tracks 40, 42, 44, 46. With each blank intermediate discharge track 40, 42, 44, 46, at least one discharge cam is associated, whose length is such that it exclusively propels blanks B of the blank intermediate discharge track 40, 42, 44, 46 with which the respective discharge cam is associated. The discharge cams of different lengths are connected with the discharge chain or discharge belt, viewed along the length thereof, in spaced relation and in succession. As a result of this configuration, blanks B which are in the end positions 40B, 42B, 44B, 46B of the blank intermediate discharge tracks 40, 42, 44, 46 are then, upon the discharge chain or discharge belt being driven, successively transferred from the blank intermediate discharge track end points 40B, 42B, 44B, 46B, located above each other, to the in-feed side of the blank main discharge assembly implemented as conveyor belt or conveyor track.

In the further elaboration of the embodiment where the blank main discharge assembly 16 is implemented as a gripper chain with grippers 17, of which an example is shown in FIGS. 1, 3 and 4, the apparatus 10 may be provided, for the purpose of the transfer of the individual blanks from the end points 40B, 42B, 44B, 46B to the grippers 17, with a transfer assembly 56 (see FIG. 3) which is disposed at the end points 40B, 42B, 44B, 46B of the blank intermediate discharge tracks 40, 42, 44, 46. The transfer assembly 56 may then be provided with a pusher cam 54 and the transfer assembly 56 is configured for positioning the pusher cam 54 on an upstream side of the blanks B which are at the end points 40B, 42B, 44B, 46B. This may be realized, for example, by a cam 54 movable up and down. When a set of four blanks B arrives at the end points 40B-46B, the cam 54 is in the upwardly moved position, so that the blanks B can pass the cam. When the blanks B thereupon lie still at the end points 40B-46B, the cam 54 of the transfer assembly 56 can move down, so that it is on the upstream side of the blanks B. In this embodiment, the transfer assembly 56 is additionally configured to proceed to push the blanks B concerned simultaneously each in a direction of a gripper 17, such that each blank B is engageable by a corresponding gripper 17 for transport to a further processing device.

For this embodiment too, it holds that it is robust and operationally reliable, while the costs thereof are relatively low. With a single, relatively simply implemented transfer assembly 56 the singulated blanks B can be simultaneously transferred to the individual grippers 17 of the gripper chain 16.

In an embodiment, of which an example is shown in FIG. 4, the apparatus 10 can comprise a vision system 60 which is configured to record the position of an uppermost blank B which is on a stack. Also present then is a control 62 which is arranged for, depending on the recorded position of a respective blank B, controlling the robot 34 which is associated with the respective stack, such that the pickup mechanism 38 is positioned in a proper pickup position for picking up the respective blank B and that, after picking up of the blank B, the pickup mechanism 38 is positioned in the proper delivery position for correctly placing the respective blank B on the blank intermediate discharge track 40, 42, 44, 46 associated with that robot 34.

Sometimes it happens that the blanks B within a stack do not lie entirely straight or, for example, are staggered. With the aid of the vision system 60 the orientation of each blank B on the stack can be determined and the robot 34 can be controlled such that both the pickup of the respective blank B and the placement thereof on a blank intermediate discharge track 40-46 proceed as desired, that is, each blank B is correctly positioned and oriented on the blank intermediate discharge track 40-46.

Figure 5:
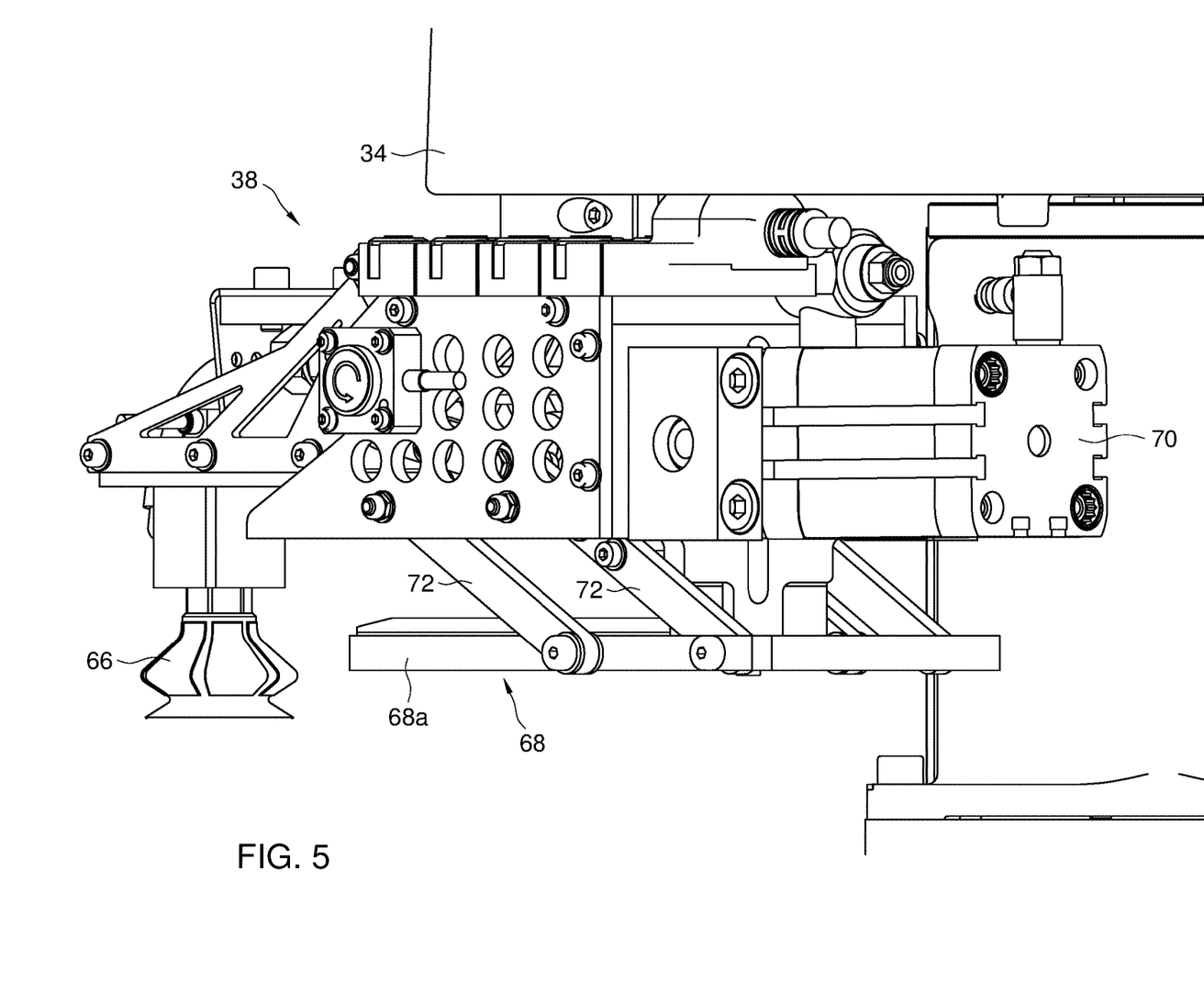
FIG. 5 shows a perspective view of the pickup mechanism which is attached at the end of the robot arm used in the example of the unstacking station represented in FIGS. 2-4.

In an embodiment, of which an example is shown in FIG. 5, which is in fact a detail of the robot 34 directly left of the middle in FIG. 4, the pickup mechanism 38 at the end of the robot arm 36 of each robot 34 can comprise a vacuum gripper which is provided with at least one suction cup 66 for engaging a blank B. The vacuum gripper is then preferably configured for lifting up a side of a blank B engaged. In addition, the pickup mechanism 38 may comprise a mechanical gripper 68 for engaging the side of the blank B lifted up by the vacuum gripper.

Such an embodiment has proved in practical tests it can ensure an operationally reliable handling and singulation of the blanks. First, a side of the blank B is lifted up in that this side is engaged with the suction cup 66 which is then moved up over some distance by the robot 34. Next, the gripper 68 is displaced with the aid of motor 70 as a result of which arms 72 pivot and gripper arm 68a moves forwards and upwards thereby clamping the lifted side of the blank B.

When a still higher production rate is desired, in an embodiment, each stack of blanks B on the pallet P may have two robots associated with it. A first of the two robots associated with a stack is then provided with a vacuum gripper provided with at least one suction cup for engaging a blank B. The vacuum gripper is configured for lifting up a side of a blank B engaged. A second of the two robots associated with a stack is then provided with the pickup mechanism 38 mentioned which is implemented as a mechanical gripper 68 for engaging the side of the blank B lifted up by the vacuum gripper. During the movement of the robot arm 36 to move a blank B from the stack to a blank intermediate discharge track 40-46, in this embodiment, the first of the two robots may already, with the aid of the vacuum gripper, be lifting a side of the next blank B, so that this side is directly engageable upon return of the robot arm 36 which carries the mechanical gripper 68. Thus, the lifting up of a side of the blanks is hence carried out simultaneously with the transport of the blanks from the stack to the blank intermediate discharge tracks 40-46. With this, the processing capacity of the apparatus 10 is further enlarged.

In an embodiment, of which an example is shown in the figures, the number of stacks of blanks B on a pallet P may be four and the unstacking station 12 is provided with four robots 34 and four blank intermediate discharge tracks 40, 42, 44, 46. Pallets P having four stacks of blanks B arranged on them is a regularly occurring situation and an unstacking station 12 implemented with four robots 34 provides the possibility to process such pallets P with four stacks in an efficient and automated manner.

In an embodiment, of which an example is shown in the figures, the blank main discharge assembly 16 may link up with a box setup device for setting up the blank to form a box. As already indicated hereinabove, such box setup devices are known per se, so that these do not require any further explanation here.

The invention is not limited to the example shown in the figures. As already indicated, the above-described embodiments may also be implemented differently than shown in the example of the figures. The scope of protection is defined by the appended claims in which the reference numerals have no limiting effect.

The invention claimed is:

1. An apparatus for automatically unstacking a pallet on which at least two stacks of blanks are arranged, the apparatus comprising:
    an unstacking station configured for:
        receiving a pallet on which are arranged at least two stacks of blanks in collapsed condition; and for
        taking off one by one individual blanks from the at least two stacks of blanks which are on a pallet which is received in the unstacking station;
    a feed track for conveying pallets, the feed track linking up by a discharge end with the unstacking station for the purpose of feeding a pallet with stacks of blanks to be unstacked to the unstacking station;
    a blank main discharge assembly for discharging individual blanks to a further processing station;
    a pallet buffer position for storing empty pallets;
    a cover buffer position for storing covers with which the at least two stacks of blanks on a pallet are covered;
    an intermediate sheet buffer position for storing intermediate sheets which extend at different height levels between the blanks of the at least two stacks of blanks; and
    a conveying device for conveying:
        a pallet from the unstacking station to the pallet buffer position,
        a cover from the unstacking station to the cover buffer position, and
        an intermediate sheet from the unstacking station to the intermediate sheet buffer position,
        wherein the conveying device is implemented as a single system which comprises a portal conveyor provided with a gripper, and wherein the gripper is configured for picking up a pallet, a cover or intermediate sheet at the unstacking station and for delivering a pallet to the pallet buffer position, a cover to the cover buffer position and for delivering an intermediate sheet to the intermediate sheet buffer position.

2. The apparatus according to claim 1, wherein the gripper is provided with suction cups for picking up intermediate sheets, wherein the gripper is additionally provided with mechanical gripper arms for picking up pallets, wherein suction cups and/or the gripper arms are further configured for picking up a cover.

3. The apparatus according to claim 1, wherein the unstacking station includes a lift on which a pallet with at least two stacks of blanks is placeable, wherein the apparatus includes an electronic control for operating the lift, such that an upper side of the at least two stacks of blanks is held at substantially the same level during unstacking.

4. The apparatus according to claim 1, wherein the unstacking station comprises:
    at least two robots, wherein with each stack of said at least two stacks of blanks which are on the pallet a robot is associated, wherein the robots are each provided with a robot arm having at the free end a pickup mechanism for picking up a single blank from the stack of blanks with which the respective robot is associated;
    at least one blank intermediate discharge track,
    wherein the at least two robots are each configured for delivering a blank present in the pickup mechanism to a blank intermediate discharge track mentioned.

5. The apparatus according to claim 4, wherein each robot is a SCARA robot.

6. The apparatus according to claim 4, wherein each robot is associated with a respective corresponding blank intermediate discharge track, such that the number of blank intermediate discharge tracks corresponds to the number of robots, wherein each blank intermediate discharge track traverses a spiral path over a segment of a circle, wherein a starting point of the spiral path of the blank intermediate discharge track belonging to a robot is in the proximity of the robot that is associated with the respective blank intermediate discharge track, wherein each blank intermediate discharge track has an end point, wherein the end points of the at least two blank intermediate discharge tracks are located above each other, and wherein the spiral paths of the at least two blank discharge tracks are located above each other, wherein an in-feed side of the blank main discharge assembly is near said end points, such that blanks that are at the end points of the blank intermediate discharge tracks are transferable on or into the blank main discharge assembly.

7. The apparatus according to claim 6, comprising: a cam intermediate conveyor including:
    a cam chain or cam belt which extends over a circular segmental path which is substantially concentric with the spiral paths of the at least two blank intermediate discharge tracks,
    cams which are connected with the cam chain or cam belt and are configured for, upon transport of the cam chain or cam belt and hence upon displacement of the cams along the spiral paths, pushing on blanks present on the blank discharge tracks over the blank intermediate discharge tracks to the end points of the blank intermediate discharge tracks.

8. The apparatus according to claim 6, wherein the blank main discharge assembly comprises a gripper chain which comprises a conveyor chain with grippers attached thereto, wherein each gripper is configured for engaging a single blank.

9. The apparatus according to claim 8, comprising: a transfer assembly which is disposed at the end points of the blank discharge tracks; wherein the transfer assembly is provided with a push cam and is configured for positioning the push cam on an upstream side of the blanks which are at the end points, wherein the transfer assembly is further configured to proceed to push the blanks concerned simultaneously each in a direction of a gripper, such that each blank is engageable by a corresponding gripper for conveyance to a further processing device.

10. The apparatus according to claim 4, comprising:
a vision system which is configured to record the position of an uppermost blank present on a stack;
a control which is configured for, depending on the recorded position of a respective blank, controlling the robot which is associated with the respective stack, such that the pickup mechanism is positioned in a proper pickup position for picking up the respective blank and that, after the picking up of the blank the pickup mechanism is positioned in the proper delivery position for correctly placing the respective blank on the blank intermediate discharge track associated with that robot.

11. The apparatus according to claim 4, wherein the pickup mechanism at the end of the robot arm of each robot comprises:
a vacuum gripper provided with at least one suction cup for engaging a blank, wherein the vacuum gripper is configured for lifting up a side of an engaged blank;
a mechanical gripper for engaging the side of the blank lifted up by the vacuum gripper.

12. The apparatus according to claim 1, wherein with each stack of blanks on the pallet, two robots are associated, wherein a first of the two robots belonging to a stack is provided with a vacuum gripper provided with at least one suction cup for engaging a blank, wherein the vacuum gripper is configured for lifting up a side of an engaged blank; wherein a second of the two robots belonging to a stack is provided with said pickup mechanism which is implemented as a mechanical gripper for engaging the side of the blank lifted up by the vacuum gripper.

13. The apparatus according to claim 1, wherein the number of stacks of blanks on a pallet is four and wherein the unstacking station is provided with four robots and four blank discharge tracks.

14. The apparatus according to claim 1, wherein the blank main discharge assembly links up with a box setup device for setting up the blank to form a box.

15. The apparatus according to claim 1, wherein the number of stacks of blanks on a pallet is four and wherein the unstacking station is provided with four robots and four blank discharge tracks.

16. An apparatus for automatically unstacking a pallet on which at least two stacks of blanks are arranged, the apparatus comprising:
an unstacking station configured for:
receiving a pallet on which are arranged at least two stacks of blanks in collapsed condition; and for taking off one by one individual blanks from the at least two stacks of blanks which are on a pallet which is received in the unstacking station;
a feed track for conveying pallets, the feed track linking up by a discharge end with the unstacking station for the purpose of feeding a pallet with stacks of blanks to be unstacked to the unstacking station; and
a blank main discharge assembly for discharging individual blanks to a further processing station;

wherein the unstacking station comprises:
at least two robots, wherein with each stack of said at least two stacks of blanks which are on the pallet a robot is associated, wherein the robots are each provided with a robot arm having at the free end a pickup mechanism for picking up a single blank from the stack of blanks with which the respective robot is associated; and
at least one blank intermediate discharge track,
wherein the at least two robots are each configured for delivering a blank present in the pickup mechanism to a blank intermediate discharge track mentioned, and
wherein each robot is associated with a respective corresponding blank intermediate discharge track, such that the number of blank intermediate discharge tracks corresponds to the number of robots, wherein each blank intermediate discharge track traverses a spiral path over a segment of a circle, wherein a starting point of the spiral path of the blank intermediate discharge track belonging to a robot is in the proximity of the robot that is associated with the respective blank intermediate discharge track, wherein each blank intermediate discharge track has an end point, wherein the end points of the at least two blank intermediate discharge tracks are located above each other, and wherein the spiral paths of the at least two blank discharge tracks are located above each other, wherein an in-feed side of the blank main discharge assembly is near said end points, such that blanks that are at the end points of the blank intermediate discharge tracks are transferable on or into the blank main discharge assembly.

17. The apparatus according to claim 16, comprising:
a cam intermediate conveyor including:
a cam chain or cam belt which extends over a circular segmental path which is substantially concentric with the spiral paths of the at least two blank intermediate discharge tracks; and
cams which are connected with the cam chain or cam belt and are configured for, upon transport of the cam chain or cam belt and hence upon displacement of the cams along the spiral paths, pushing on blanks present on the blank discharge tracks over the blank intermediate discharge tracks to the end points of the blank intermediate discharge tracks.

18. The apparatus according to claim 16, wherein the blank main discharge assembly comprises a gripper chain which comprises a conveyor chain with grippers attached thereto, wherein each gripper is configured for engaging a single blank.

19. The apparatus according to claim 18, comprising:
a transfer assembly which is disposed at the end points of the blank discharge tracks,
wherein the transfer assembly is provided with a push cam and is configured for positioning the push cam on an upstream side of the blanks which are at the end points, wherein the transfer assembly is further configured to proceed to push the blanks concerned simultaneously each in a direction of a gripper, such that each blank is engageable by a corresponding gripper for conveyance to a further processing device.

20. The apparatus according to claim 16, comprising:
a vision system which is configured to record the position of an uppermost blank present on a stack; and
a control which is configured for, depending on the recorded position of a respective blank, controlling the robot which is associated with the respective stack, such that the pickup mechanism is positioned in a proper pickup position for picking up the respective blank and that, after the picking up of the blank the pickup mechanism is positioned in the proper delivery position for correctly placing the respective blank on the blank intermediate discharge track associated with that robot.

21. The apparatus according to claim 16, wherein the pickup mechanism at the end of the robot arm of each robot comprises:
   a vacuum gripper provided with at least one suction cup for engaging a blank, wherein the vacuum gripper is configured for lifting up a side of an engaged blank; and
   a mechanical gripper for engaging the side of the blank lifted up by the vacuum gripper.

22. The apparatus according to claim 16, wherein with each stack of blanks on the pallet, two robots are associated,
   wherein a first of the two robots belonging to a stack is provided with a vacuum gripper provided with at least one suction cup for engaging a blank, wherein the vacuum gripper is configured for lifting up a side of an engaged blank, and
   wherein a second of the two robots belonging to a stack is provided with said pickup mechanism which is implemented as a mechanical gripper for engaging the side of the blank lifted up by the vacuum gripper.

23. The apparatus according to claim 16, wherein the blank main discharge assembly links up with a box setup device for setting up the blank to form a box.

* * * * *